United States Patent [19]
Hix

[11] Patent Number: 5,263,574
[45] Date of Patent: Nov. 23, 1993

[54] INTERLOCKING FLIGHT FOR CONVEYOR SYSTEMS

[75] Inventor: Marcus Hix, Fort Mitchell, Ky.

[73] Assignee: T.K.F., Inc., Cincinnati, Ohio

[21] Appl. No.: 43,285

[22] Filed: Apr. 6, 1993

[51] Int. Cl.⁵ .............................................. B65G 17/16
[52] U.S. Cl. ........................................ 198/799; 198/853
[58] Field of Search .......................... 198/799, 851, 853

[56] References Cited

U.S. PATENT DOCUMENTS

| | | | |
|---|---|---|---|
| 2,828,002 | 3/1958 | Sawrie . | |
| 3,024,891 | 3/1962 | Sawrie | 198/799 |
| 3,268,061 | 8/1966 | DeGood et al. | 198/799 |
| 3,529,732 | 9/1970 | Wayne | 198/799 X |
| 3,732,970 | 5/1973 | Nakanishi et al. | 198/799 |
| 3,750,863 | 8/1973 | Dyczynski | 198/851 X |
| 4,267,922 | 5/1981 | Patin et al. | 198/851 |
| 4,627,530 | 12/1986 | Franke | 198/799 |

FOREIGN PATENT DOCUMENTS

| | | | |
|---|---|---|---|
| 514756 | 6/1976 | U.S.S.R. | 198/799 |
| 1276581 | 12/1986 | U.S.S.R. | 198/799 |
| 1446859 | 8/1976 | United Kingdom | 198/799 |
| 1571497 | 7/1980 | United Kingdom | 198/799 |

OTHER PUBLICATIONS

Escaveyor Trade Brochure (No Date).
Engineering Drawing of Escaveyor Vertical Conveyor (No Date).
Z-Loda Trade Brochure (No Date).
Vertiveyor Trade Brochure.
TKF Vertical Conveyors Trade Brochure.
Engineering Drawing of Platform for TKF Vertical Conveyor Model 4-SC.

*Primary Examiner*—D. Glenn Dayoan
*Attorney, Agent, or Firm*—Mueller and Smith

[57] ABSTRACT

The present invention relates to an interlocking flight for forming a flexible platform of a conveyor which may be of the continuous, vertical type. The flight is provided with oppositely-disposed first and engaging surfaces and an elongate portion having an upper surface generally normal to the engaging surfaces for forming a portion of the top surface of the platform. The flight is also provided with a pair of flanged portions which extend from opposite ends of the elongate portion. The flanged portions have opposing inner surfaces disposed generally normal to the elongate portion upper surface and a pair of opposing pivot pins, each of which extends from an inner surface. Also disposed at opposite ends of the elongate portion are a pair of land portions configured for rotatably receiving a corresponding flanged portion from another flight and having an opening for receiving a corresponding pivot pin therefrom to effect an interlocking engagement therebetween. Rotation of the flight is provided in a first direction about the pivot pins of another flight interlocked therewith to thereby make the platform flexible in the first direction. However, rotation of the flight in a second direction opposite the first direction is delimited by the second engaging surface of the flight abuttingly engaging a corresponding first engaging surface of the flight interlocked therewith to thereby make the platform rigid for supporting a load when extended horizontally.

50 Claims, 5 Drawing Sheets

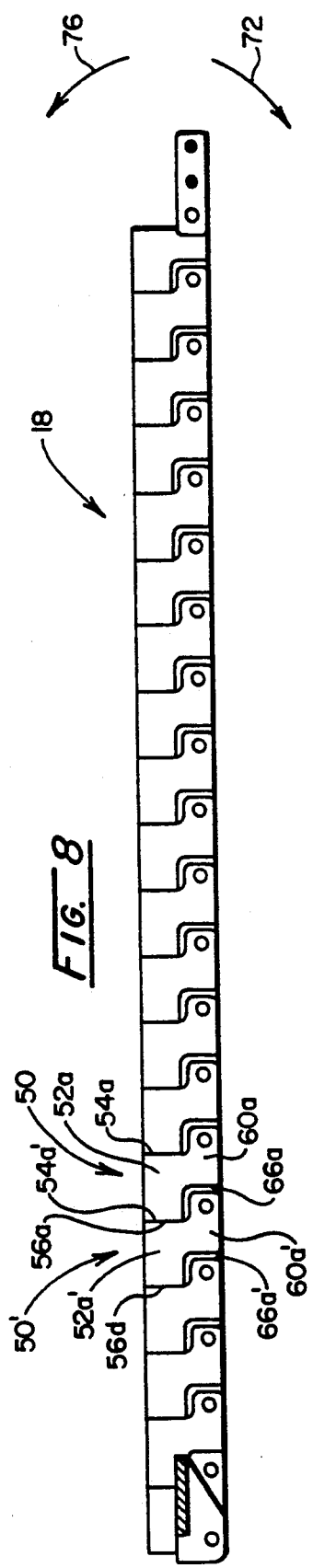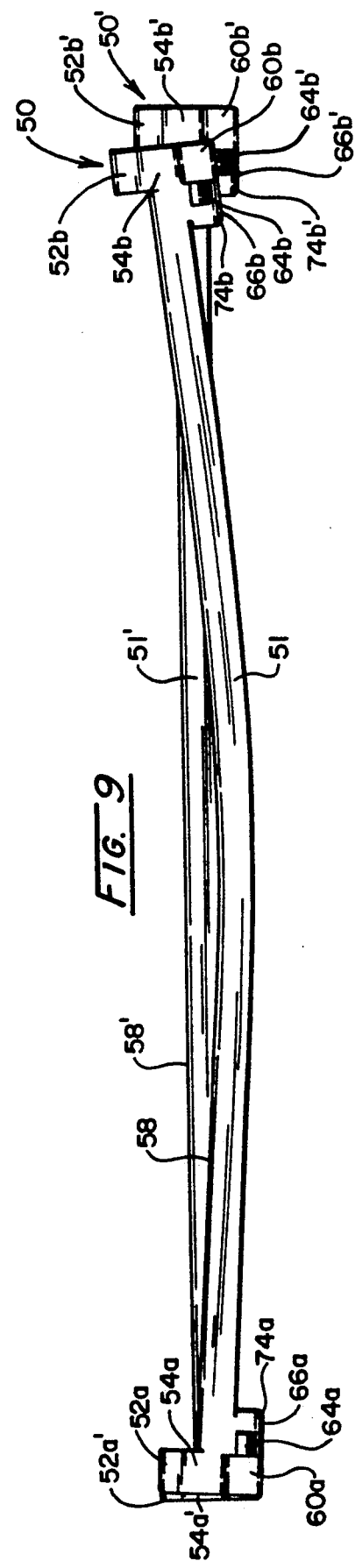

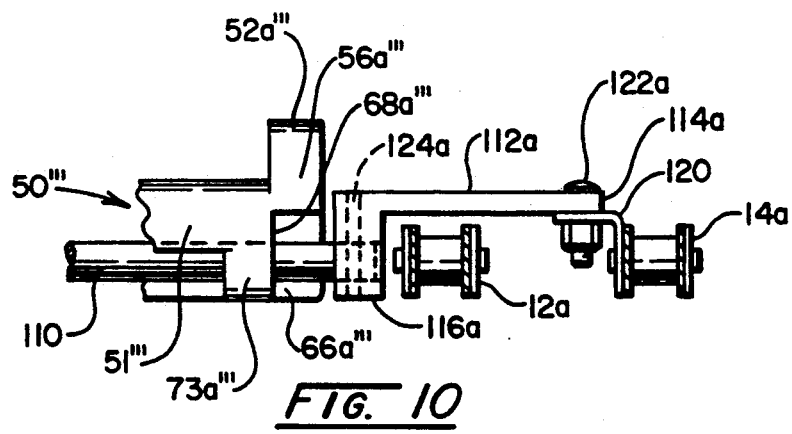
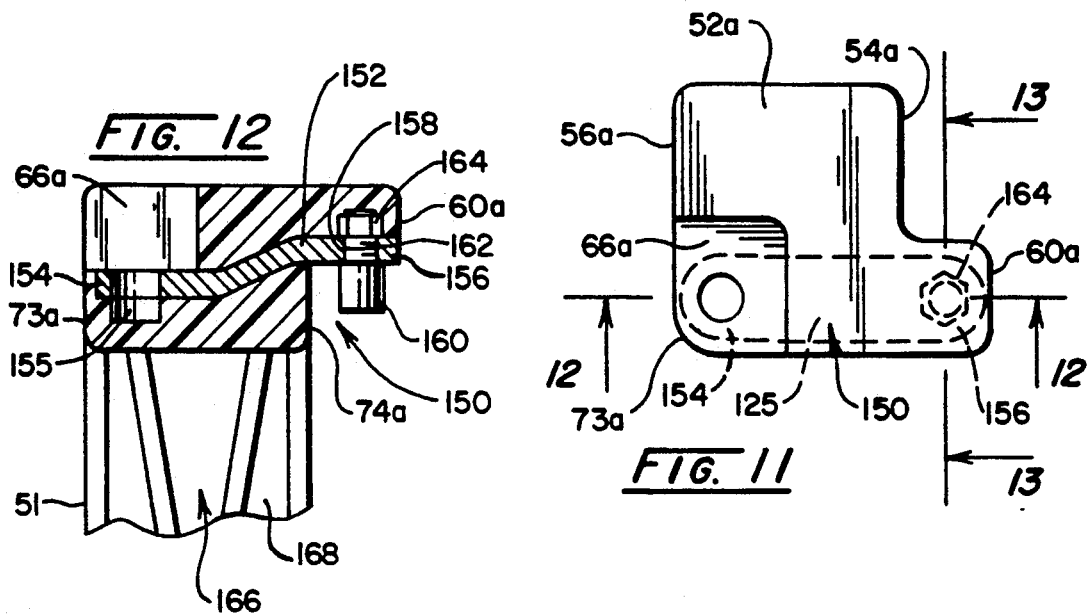
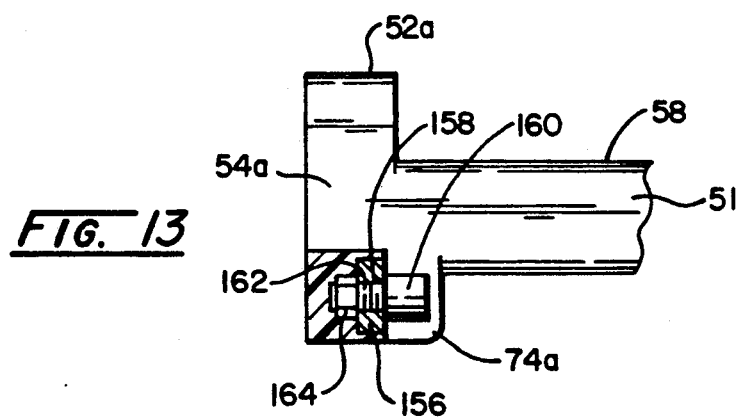

INTERLOCKING FLIGHT FOR CONVEYOR SYSTEMS

BACKGROUND OF THE INVENTION

The present invention relates broadly to an interlocking flight finding particular application in continuous vertical conveyor systems and the like.

Vertical conveyor systems are employed by manufacturing, transportation, and other industries in the movement of goods from one elevational level to another. Advantageously, vertical conveyors optimize the utilization of plant floor space. Inasmuch as goods are moved directly in an upwards or downwards direction, the space needed for such a transport system is generally less than that associated with other elevational conveying systems such as, for example, an inclined belt or roller conveyor. Thus, vertical conveyors provide multi-level transport in a minimum of space allowing for the efficient utilization of a plant floor by exploiting air space above or below the floor which is usually left vacant. Moreover, process materials, goods, or the like may be transported up and over or down and under process machinery, aisles, and other obstacles to thereby avoid the expense associated with production line changes.

In general operation, continuous vertical conveyors are designed to accept a load horizontally, convey it vertically, and then discharge it horizontally at an elevational level higher or lower than the level on which it was accepted. Accordingly, loading and unloading is effected in a Z-shaped pattern. That is, the goods are infed to the vertical conveyor via a feed conveyor, which may be, for example, of a live roller or belt type, for receipt by a lift platform. The platform is fastened at opposite ends between a pair of inside and outside chains which, when powered by a drive motor and a system of drive and idler rollers, effect the horizontal and vertical translation of the platform. For continuous, cyclic operation in the automatic transport of goods, a plurality of platforms fastened between the inside and the outside chains typically are provided. As a moving platform receives each load from the feed conveyor and conveys it either upwardly or downwardly to an unload station, another platform is returned to the feed conveyor to receive the next load. A typical continuous vertical conveyor system is described in U.S. Pat. No. 3,024,891, the disclosure of which is expressly incorporated herein by reference.

Heretofore, the lift platforms known in the prior art, such as those used in, for example, vertical conveyor model 40-50 manufactured by Vertical Systems, Incorporated, of Louisville, Ky., and in model 4-SC manufactured by TKF Incorporated, of Cincinnati, Ohio, have been comprised of a relatively complex combination of tubular platform tubes fastened between a pair of flexible hinge assemblies. Between the hinge assemblies at opposite ends of the platform are fastened a pair of flat support members which, in turn, are fastened between the inside and outside chains. Although advantageously providing for rigidity while in a horizontal, load-carrying position and for flexibility in the opposite direction to allow for rotation around drive sprockets and the like, such platforms are quite material and labor intensive owing to the number of component parts which must be fastened together with bolts, nuts, and the like. Such material and labor intensiveness understandably lead to an expense which could be eliminated were the platform assembly simplified. Thus, it is apparent that improvements in platforms would be well-received by the various industries which employ continuous vertical conveyor systems.

BROAD STATEMENT OF THE INVENTION

The present invention relates to a flight and to a platform formed from a plurality thereof for incorporation into, for example, a vertical conveyor. The flight is adapted for an interlocking engagement which simplifies assembly of the platform in consolidating the component parts which heretofore had to be assembled into a complex arrangement with associated bolts, nuts, and the like. Although its assembly is simplified, the platform is still provided to be rigid while in a horizontal load-carrying position and flexible in an opposite direction to allow for rotation around drive sprockets and the like.

It is, therefore, a feature of the invention to provide an interlocking flight for forming a flexible platform of a conveyor which may be of the vertical type. The flight has oppositely-disposed first and second engaging surfaces and an elongate portion having an upper surface generally normal to the engaging surfaces for forming a portion of the top surface of the platform. The flight is also provided with a pair of flanged portions which extend from opposite ends of the elongate portion. The flanged portions have opposing inner surfaces disposed generally normal to the elongate portion upper surface and a pair of opposing pivot pins, each of which extends from an inner surface. Also disposed at opposite ends of the elongate portion are a pair of land portions configured for rotatably receiving a corresponding flanged portion from another flight and having an opening for receiving a corresponding pivot pin therefrom to effect an interlocking engagement therebetween. Rotation of the flight is provided in a first direction about the pivot pins of another flight interlocked therewith to make the platform flexible in the first direction. However, rotation of the flight in a second direction opposite the first direction is delimited by the second engaging surface of the flight abuttingly engaging a corresponding first engaging surface of the flight interlocked therewith to thereby make the platform rigid for supporting a load when extended horizontally.

It is a further feature of the invention to provide in a continuous vertical conveyor for cyclically conveying articles infed thereto at a first elevational level to a second elevational level, a flexible platform formed of a plurality of interlocking flights. Each interlocking flight has a first engaging surface and a second engaging disposed opposite the first engaging surface. For forming a portion of the top surface of the platform, the flight is provided with an elongate portion having an upper surface which is generally normal to the engaging surfaces. A pair of flanged portions are also provided to extend from opposite ends of the elongate portion. The flanged portions have opposing inner surfaces disposed generally normal to the elongate portion upper surface and a pair of opposing pivot pins, each extending from a flanged portion inner surface. Also disposed at opposite ends of the elongate portion are a pair of land portions configured for rotatably receiving a corresponding flanged portion from another flight and having an opening for receiving a corresponding pivot pin therefrom to effect an interlocking engagement of the flights forming the platform. Rotation of each interlocked flight is provided in a first direction about the pivot pins of an adjacent flight interlocked therewith to make the platform flexible in the first direction. However, rotation of the flights in a second direction opposite the first direction is delimited by the second engaging surface of each flight abuttingly engaging a corresponding first engaging surface of an adjacent flight to make the platform rigid when extended horizontally. Assemblies for attaching a first end of the platform to the inside chains of the conveyor and for attaching a second end of the platform to the outside chains of the conveyor are also provided.

It is yet a further feature of the invention to provide a method for conveying articles infed to a continuous vertical conveyor at a first elevational level to a second elevational level. The method entails providing a flexible platform formed of a plurality of interlocking flights and having a first end mounted between the inside chains of the conveyor and a second end mounted between the outside chains of the conveyor. Each flight has a first engaging surface and a second engaging disposed opposite the first engaging surface. For forming a portion of the top surface of the platform, each flight is provided with an elongate portion having an upper surface which is generally normal to the engaging surfaces. A pair of flanged portions are also provided to extend from opposite ends of the elongate portion. The flanged portions have opposing inner surfaces disposed generally normal to the elongate portion upper surface and a pair of opposing pivot pins, each of which extends from a flanged portion inner surface. Also disposed at opposite ends of the elongate portion are a pair of land portions configured for rotatably receiving a corresponding flanged portion from another flight and having an opening for receiving a corresponding pivot pin therefrom to effect an interlocking engagement of the flights forming the platform. Rotation of each interlocked flight is provided in a first direction about the pivot pins of adjacent flight interlocked therewith to make the platform flexible in the first direction. However, rotation of each flight in a second direction opposite the first direction is delimited by the second engaging surface of each flight abuttingly engaging a corresponding first engaging surface of an adjacent flight to thereby make the platform rigid when extended horizontally. Assemblies for attaching a first end of the platform to the inside chains of the conveyor and for attaching a second end of the platform to the outside chains of the conveyor are also provided. The method also entails infeeding an article to the conveyor at the first elevational level and receiving it on the platform. The first and second ends of the platform are then extended between the inside and outside chains to horizontally dispose the platform. The platform is then moved from the first to the second elevational level where the article is discharged from the conveyor. Finally, the platform is returned to the first elevational level.

These and other features will be readily apparent to those skilled in the art based upon the disclosure contained herein.

BRIEF DESCRIPTION OF THE DRAWINGS

FIG. 8 is a side elevation view of the platform of FIG. 7 taken along reference line 8—8 of FIG. 7.

FIG. 9 is a front elevation view of the flights of FIG. 6 showing one method of effecting an interlocking engagement therebetween.

FIG. 10 is a side elevation view taken along reference line 10—10 of FIG. 7 of a coupling block for attaching a second end of the platform of FIG. 7 to an outside chain of the vertical conveyor of FIG. 1.

FIG. 11 is a side view of the flight of FIG. 3 having a pivot pin and a land portion opening formed as a discrete member.

FIG. 12 is a cross-sectional view of the flight of FIG. 11 taken along reference line 12—12 of FIG. 11.

FIG. 13 is a cross-sectional view of the flight of FIG. 11 taken along reference line 13—13 of FIG. 11.

These drawings will be described in detail in connection with the Detailed Description of the Invention which follows.

DETAILED DESCRIPTION OF THE INVENTION

Figure 1:
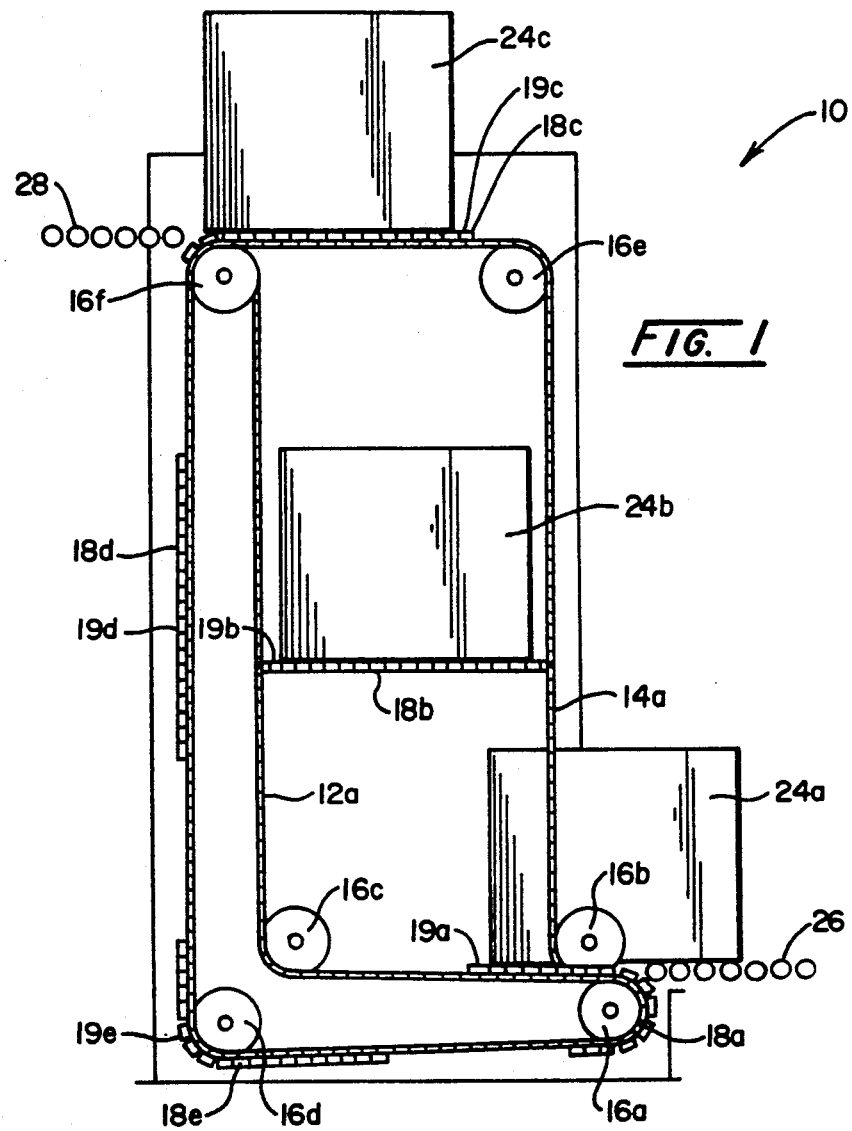
FIG. 1 is a side elevation view of a continuous vertical conveyor.
Figure 2:
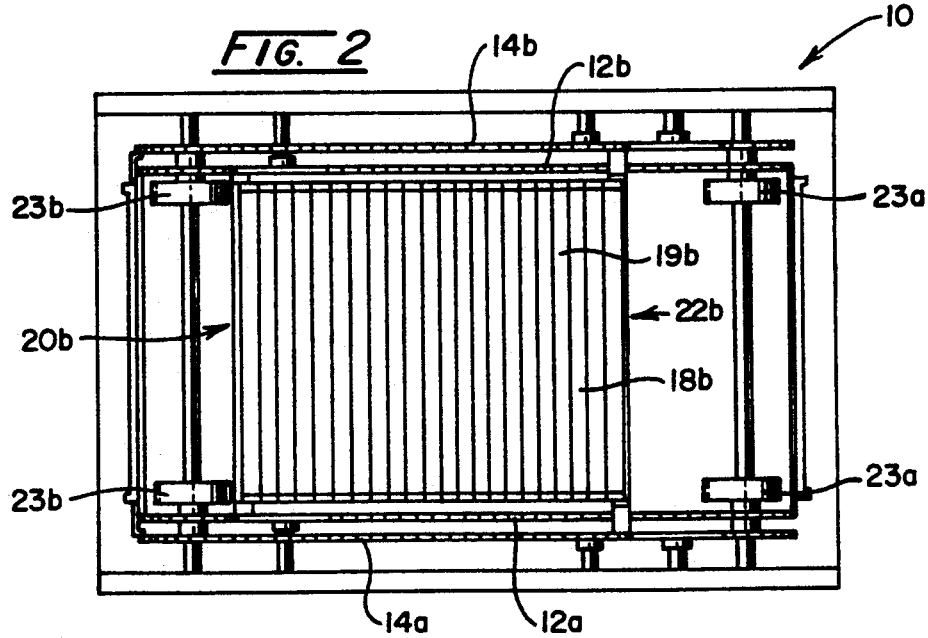
FIG. 2 is a plan view of the vertical conveyor of FIG. 1.

Referring initially to FIGS. 1 and 2, a conveyor of the continuous, vertical variety for cyclically conveying articles infed thereto at a first elevational level to a second elevational level is shown generally at 10. Continuous vertical conveyor 10 essentially comprises a pair of inside chains, 12a and 12b, and a pair of outside chains, 14a and 14b, disposed in a predetermined pattern as governed by the placement of a plurality of drive roller or sprocket pairs, 16a-f. Extending between inside chains 12 and outside chains 14 are a plurality of flexible platforms, 18a-e, each having a top surface, 19a-e, for supporting a load, a first end, one of which is represented at 20b (FIG. 2), extending between and connected to inside chains 12a and 12b, and a second end, one of which is represented at 22b (FIG. 2), extending between and connected to outside chains 14a and 14b. Platforms 18 may be supported about sprocket pairs 16a-f by associated rollers, two pairs of which are shown at 23a and 23b. In turn, platforms 18 support conveyed articles, 24a-c, which are horizontally infed to conveyor 10 at the first elevational level via a feed conveyor, 26, which may be, for example, of a live roller or belt-type. A corresponding discharge conveyor, 28, is provided at the second elevational level for transporting outfed articles 24a-c horizontally discharged from conveyor 10.

In general operation, platforms 18a-e of conveyor 10 are continuously driven in a cyclic fashion by inside drive chains 12 and outside drive chains 14. As, for example, platform 18a receives article 24a from feed conveyor 26, platform 18b is vertically conveying article 24b, and platform 18c is discharging article 24c from conveyor 10 and onto discharge conveyor 28. Concomitantly, platforms 18d and 18e, shown to be on the return phase of the cycle, are returned to load conveyor 26 to again receive an article 24 therefrom. Of course, the cyclic operation of conveyor 10 may be reversed to convey articles downwardly instead of upwardly by reversing the rotation of sprocket pairs 16a-f driving inside chains 12 and outside chains 14.

Figure 3:
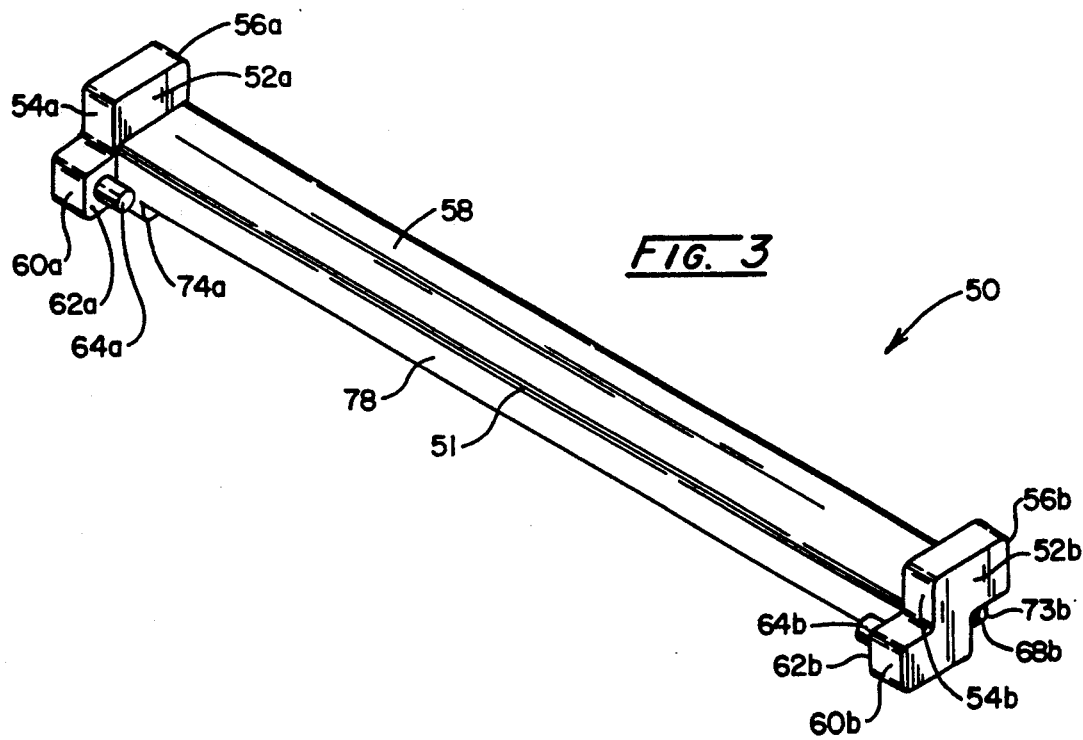
FIG. 3 is an isometric view of an interlocking flight according to the instant invention.
Figure 4:
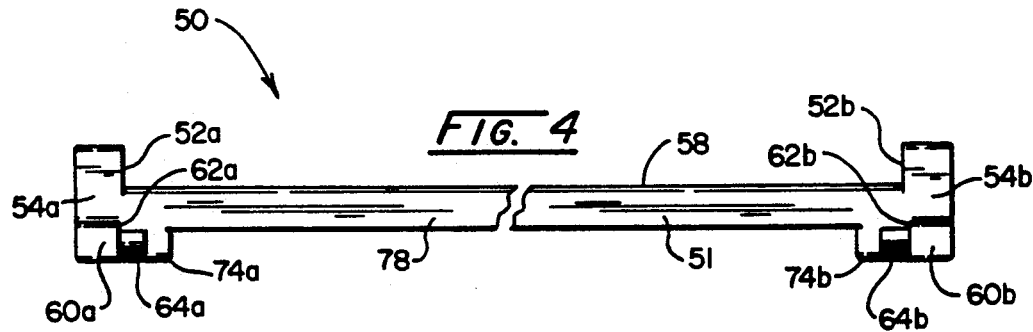
FIG. 4 is a front elevation view of the flight of FIG. 3.
Figure 5:
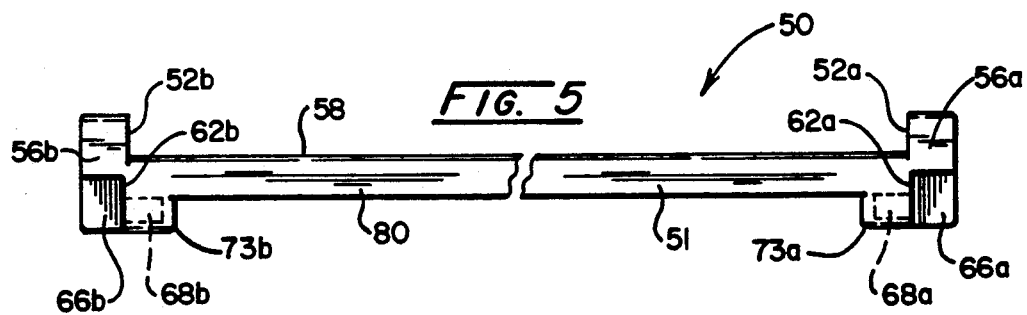
FIG. 5 is back elevation view of the flight of FIG. 3.

From the foregoing operational description of vertical conveyor 10, it may appreciated that a platform 18 must be provided to be rigid for supporting an article 24 or other load when extended horizontally between a first end 20 and a second end 22. Moreover, it may also be appreciated that a platform 18 must also be provided to be flexible about a sprocket pair 16 for being returned from the second to the first elevational level. In this regard, and looking to FIGS. 3–5, a flight in accordance with the precepts of the present invention is shown generally at 50. Each flight 50 is adapted for interlocking engagement with a corresponding flight 50 for forming at least a portion of a platform 18 and is provided with an elongate portion, 51, and, preferably, a pair of upstanding portions, 52a and 52b, each having, respectively, a first engaging surface, 54a and 54b, and a second engaging surface, 56a and 56b. Elongate portion 51 has an upper surface, 58, disposed generally normally to engaging surfaces 54 and 56 for forming a portion of a platform top surface 19. Each flight 50 is also provided with a pair of flanged portions, 60a and 60b, extending from opposite ends of elongate portion 51 and having respectively opposing inner surfaces, 62a and 62b, disposed generally normal to upper surface 58 of elongate portion 51. A pair of opposing pivot pins, 64a and 64b, are provided to extend from inner surfaces 62 of flanged portions 60.

For effecting an interlocking engagement with another flight 50 for forming at least a portion of a platform 18, flight 50 is provided with a pair of land portions, represented at 66a and 66b, disposed at opposite ends of elongate portion 51 adjacent a flanged portion 60. Each land portion 66 is provided with an opening, represented at 68a and 68b, configured to receive a corresponding pivot pin 64 from the other flight 50. Each land portion 66 is also configured to rotatably receive a flanged portion 60 from the other flight 50 as may be seen by additional reference to FIG. 6 and wherein a flight 50 is shown to be interlockably engaged with another flight 50 represented at 50'. Looking momentarily to FIG. 9, it may be seen that elongate portion 51 of flight 50 may be provided to be flexible so that pivot pins 64' of flight 50' may be inserted into corresponding openings 68 of flight 50 to accommodate the interlocking engagement of flight 50' to flight 50.

Figure 6:
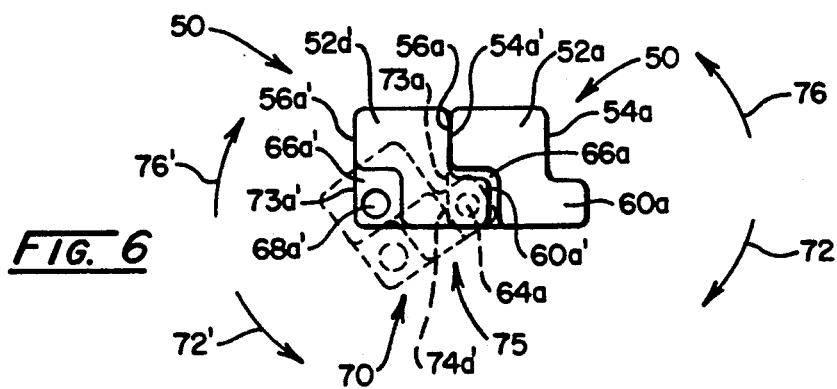
FIG. 6 is a side elevation view of the flight of FIG. 3 interlocked with a second flight according to the present invention showing the rotation of the second flight in phantom.

As is shown in phantom at 70 in FIG. 6, when interlockably engaged to flight 50, flight 50' is provided to be rotatable about flight 50 in a first direction represented by arrow 72'. Advantageously, the rotation of flight 50' about flight 50 in first direction 72' may be delimited by configuring land portions 68 to extend from elongate portion 51 to form rearward shoulder portions, 73a and 73b, about openings 68 and forward shoulder portions, 74a and 74b, for abutting engagement with corresponding rearward shoulder portions, 73', of flight 50 at a predetermined angle of rotation as is shown 75. Thus, by configuring land portions 66 of flight 50 to rotatably receive corresponding flanged portions 60' from interlocked flight 50', a platform 18 comprised of a plurality of interlocked flights 50 is provided to be flexible in first direction 72' to a predetermined degree or angle of rotation for movement about sprockets 16. However, by configuring land portions 66 of flight 50 to abuttingly engage corresponding land portions 66' of interlocked flight 50' at a predetermined angle of rotation, the potential for a one of a plurality of interlocked flights 50 to "jack-knife" and interfere with the movement of platform 18 is thereby decreased.

For a platform 18 comprised of a plurality of interlocked flights 50 to be rigid for supporting a load when extended between first end 20 and second end 22, rotation of flight 50' about flight 50 in a second direction represented by arrow 76' is provided to be delimited by the abutting engagement of first engaging surface 54a' of flight 50' with the corresponding second engaging surface 56a of flight 50. Further in this regard, although the foregoing interlocking engagement of flight 50 and 50' has been described in connection with the rotation of flight 50' about flight 50, it may be appreciated that flight 50 is also rotatable about flight 50' is a first direction represented at 72. Likewise, the rotation of flight 50 about flight 50' in a second direction represented by arrow 76 is delimited by the abutting engagement of second engaging surface 56a thereof with a corresponding first surface, 54a', of flight 50'. Thus, when a platform 18 is coupled to chains 12 and 14 of a vertical conveyor 10, platform 18 advantageously may be moved in either of the directions effected by the clockwise or counterclockwise rotation of sprockets 16 to correspondingly drive inside chains 12 and outside chains 14.

Figure 7:
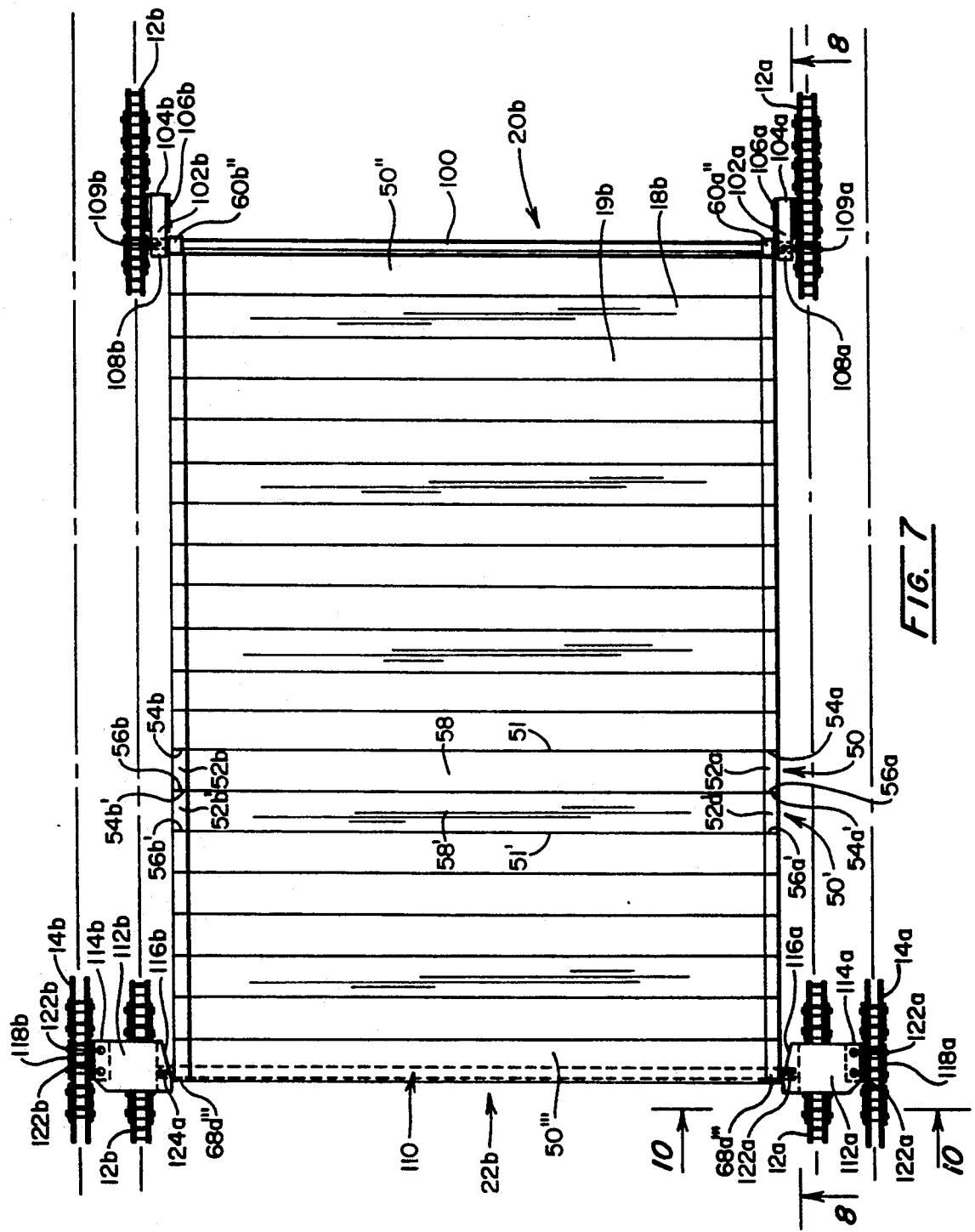
FIG. 7 is a plan view of the flights of FIG. 6 interlockably engaged within a plurality of flights according to the present invention to form a platform incorporated into the vertical conveyor of FIG. 1.

Looking momentarily to FIGS. 7 and 8, interlocked flights 50 and 50', are shown to comprise a portion of a platform 18 comprised of a plurality of interlocked flights 50. From FIG. 7, it may be appreciated that upstanding portions 52a and 52a' of interlocked flights 50 and 50' advantageously comprise a portion of an upstanding wall which, for example, may function to retain articles 24 on top surface 19 of platform 18. Moreover, it may also be appreciated that by disposing engaging surfaces 54 and 56 on upstanding portions 52, the number of flights 50 comprising a given platform 18 may be varied by simply extending the lengths of flanged portions 60 and correspondingly extending the lengths of upstanding portions 52. Thus, a practitioner of the invention is given the design option to vary the spacing between upper surfaces of 58 of elongate portions 51 to provide for either a continuous or a "gapped" top surface 19 of platform 18 when horizontally extended between its first end 20 and its second end 22. This design option affords a practitioner to tailor the top surface 19 of a platform 18 to the footprint of the load to be conveyed or to more economically construct a platform 18 from a minimum number of flights where capital equipment expense is an overriding consideration. Alternatively, however, a practitioner is also afforded the design option to eliminate upstanding portions 52 of flight 50. Returning momentarily to FIGS. 3–6, it may be seen that in such a configuration, surfaces 78 and 80 of elongate portion 51 would function as, respectively, first engaging surfaces 54 and second engaging surfaces 56.

Looking to FIG. 7, the attachment of platform 18b between inside chains 12 and outside chains 14 of vertical conveyor 10 is revealed. In accordance with the precepts of the present invention, platform 18b is shown to be comprised of flights 50 and 50' interlockably engaged within a plurality of flights 50. For mounting first end 20b of platform 18b between inside chains 12a and 12b, an elongate lead bar, 100, preferably formed of a metallic material, is provided to extend between and through flanged portions 60a" and 60b" in place of the pivot pins of a lead flight, 50", forming first end 20b of platform 18b. For attaching each end of lead bar 100 to an inside chain 12, a first pair of coupling blocks, 102a and 102b is provided. Each coupling block 102 has a first end, 104a and 104b, adapted for interlocking engagement with a corresponding inside chain 12. In this regard, master links 106a and 106b may be provided to extend through coupling blocks 102 and inside chains 12 to interlock each coupling block 102 to an inside chain 12. Each coupling block 102 also has a second end, 108a and 108b, configured to pivotally receive one end of lead bar 100. To retain lead bar 106 within coupling blocks 102, pins, 109a and b, may be provided to extend through a coupling block 102 at each end of lead bar 100.

Similarly, for mounting second end 22b of platform 18b between outside chains 14a and 14b, an elongate trail bar, shown in phantom at 110, also preferably formed of a metallic material, is provided to extend between and through flanged portion openings 68a''' and 68b''' of a trail flight, 50''', forming second end 22b of platform 18b. For attaching each end of trail bar 110 to an outside chain 14, a second pair of coupling blocks, 112a and 112b is provided. Looking additionally to FIG. 10, each coupling block 112 may be seen to have a first end, 114a and 114b, adapted for interlocking engagement with a corresponding chain 14 and second end, 116a and 116b, configured to pivotally receive one end of lead bar 112. However, inasmuch as accommodation must be made for the passage of an inside chain 12 between each end of trail bar 110 and an outside chain 14, each coupling block 112 is provided with a generally U-shaped cross-section. In this regard, master links 118a and 118b each may be provided to extend through an outside chain 14 and an L-shaped bracket, 120, attached to a coupling block 112 via a fastening member pair, 122a and 122b. To retain trail bar 110 within a second end 116 of each coupling block 112, pins, 124a and b, may be provided to extend through a coupling block 112 second end 116 at each end of trail bar 110.

Depending on the material of construction of flights 50, e.g., an engineering thermoplastic or the like, a considerable load may be supported. However, it may be appreciated that considerable shear forces are developed at pivot pins 64 and land portion openings 68. Accordingly, to extend the operational life of flights 50, pivot pins 64 and land portion openings 68 may be provided as a separate component which, preferably, is formed of a metallic material or the like having a relatively high tensile strength. As may be seen in FIGS. 11, 12, and 13, this separate component, shown generally at 150, may be provided as a generally elongate member, 152, extending between a first end, 154, adapted to form a land portion opening 68 represented at 155, and a second end, 156, adapted to form a pivot pin 64. For forming a pivot pin 64, elongate member 152 second end 156 may comprise an integrally-formed opening, represented at 158, adapted to receive a peg, 160. For retention within opening 158, peg 160 may be provided with a threaded portion, 162, and a nut, 164, adapted for a threaded engagement with threaded portion 162.

Advantageously, flight 50 may be economically constructed of a thermoplastic polymeric material and manufactured via an injection molding process or the like as an integrally-formed member. Alternatively, if pivot pins 64 and land portion openings 68 are desired to be provided as a separate component formed of, for example, a cold-rolled steel or the like, elongate portion 51, upstanding portions 52, and flanged portions 60 may be integrally-formed with component 150 molded thereinto. For strengthening elongate portion 51, support ribs, a portion of which are shown in FIG. 12 at 166, may also be molded into a lower surface, 168, of elongate portion 51 opposite upper surface 58.

Although flights 50 and the platforms 18 comprised thereof have been described in combination with a vertical conveyor, it may be appreciated that the utility of the present invention is so limited. Accordingly, it is within the precepts of the present invention to incorporate a platform 18 comprised of a plurality of flights 50 into, for example, a horizontal conveyor having a pair of oppositely-disposed drive chains. Such an incorporation may be effected by, for example, providing two pairs of coupling blocks 102 to attach each end of a platform 18 between the drive chains of the conveyor. Other uses for flights 50 and platforms 18 can likewise be contemplated.

Since certain changes may be made without departing from the scope of the invention herein involved, it is intended that all matter contained in the above description or shown in the accompanying drawings shall be interpreted as illustrative and not in a limiting sense.

What is claimed:

1. A flight adapted for interlocking engagement with another said flight for forming at least a portion of a flexible platform having a top surface for supporting a load, a first end and a second end, said flight comprising:
   (a) a first engaging surface;
   (b) a second engaging surface disposed opposite said first engaging surface;
   (c) an elongate portion having an upper surface generally normal to said engaging surfaces for forming a portion of said platform top surface;
   (d) a pair of flanged portions extending from opposite ends of said elongate portion and having opposing inner surfaces disposed generally normal to said elongate portion upper surface;
   (e) a pair of opposing pivot pins, each extending from a said flanged portion inner surface; and
   (f) a pair of land portions disposed at opposite ends of said elongate portion, each said land portion configured for rotatably receiving a corresponding flanged portion from another said flight and each having an opening for receiving a corresponding pivot pin therefrom to effect an interlocking engagement therebetween;

whereby rotation of said flight is provided in a first direction about the pivot pins of another said flight interlocked therewith so that said platform is provided to be flexible in said first direction and is delimited in a second direction opposite said first direction by said second engaging surface abuttingly engaging a corresponding first engaging surface of the flight interlocked therewith so that said platform is provided to be rigid for supporting said load when extended horizontally between said first and said second ends.

2. The flight of claim I wherein said elongate portion is provided to be flexible for insertion of said pivot pins into the land portions of another said flight to effect an interlocking engagement therebetween.

3. The flight of claim 1 further comprising a pair of upstanding members extending from opposite ends of said elongate portion.

4. The flight of claim 3 wherein each said upstanding member has a first surface forming said first engaging surface and a second surface forming said second engaging surface.

5. The flight of claim 1 wherein each said land portion is configured to abuttingly engage a corresponding land portion of another said flight interlocked therewith at a predetermined angle delimiting rotation in said first direction.

6. The flight of claim 5 wherein each said land portion extends from said elongate portion to form a rearward should portion about said opening and a forward shoulder portion for abutting engagement at said predetermined angle with a corresponding rearward shoulder portion of another said flight interlocked therewith.

7. The flight of claim 1 wherein said flight is integrally-formed from a polymeric material.

8. The flight of claim 7 further comprising support ribs integrally-formed into a lower surface of said elongate portion opposite said upper surface.

9. The flight of claim 1 wherein said pivot pins and said land openings are provided as a pair of elongate members, each said elongate member extending between a first end adapted to form a said land opening and a second end adapted to form a said pivot pin.

10. The flight of claim 9 wherein a said elongate member is formed of a metallic material.

11. The flight of claim 9 wherein a said elongate member is molded into a said land portion and an adjacent said flanged portion.

12. The flight of claim 11 wherein said elongate member is formed of a metallic material.

13. The flight of claim 12 further comprising support ribs integrally-formed into a lower surface of said elongate portion opposite said upper surface.

14. A platform formed by a plurality of interlocked flights of claim 1.

15. The platform of claim 14 further comprising means for attaching said platform between a pair of drive chains of a conveyor.

16. The platform of claim 15 wherein said means for attaching said platform between a pair of drive chains of a conveyor comprises:
a first elongate bar extending between and through the flanged portions in place of the pivot pins of a said flight at said first end of said platform;
a first pair of coupling blocks for attaching said first bar to each said drive chain, each said first coupling block having a first end adapted for interlocking engagement with a said drive chain and a second end configured to pivotally receive one end of said first bar,
a second elongate bar extending between and through the land portion openings of a said flight at said second end of said platform; and
a second pair of coupling blocks for attaching said second bar to each said drive chain, each said second coupling block having a first end adapted for interlocking engagement with a said drive chain and a second end configured to pivotally receive one end of said second bar.

17. A platform formed by a plurality of interlocked flights of claim 9.

18. The platform of claim 17 further comprising means for attaching said platform to the drive chain of a conveyor.

19. The platform of claim 18 wherein said means for attaching said platform between a pair of drive chains of a conveyor comprises:
a first elongate bar extending between and through the flanged portions in place of the pivot pins of a said flight at said first end of said platform;
a first pair of coupling blocks for attaching said first bar to each said drive chain, each said first coupling block having a first end adapted for interlocking engagement with a said drive chain and a second end configured to pivotally receive one end of said first bar;
a second elongate bar extending between and through the land portion openings of a said flight at said second end of said platform; and
a second pair of coupling blocks for attaching said second bar to each said drive chain, each said second coupling block having a first end adapted for interlocking engagement with a said drive chain and a second end configured to pivotally receive one end of said second bar.

20. In a continuous vertical conveyor for cyclically conveying articles infed thereto at a first elevational level to a second elevational level, said conveyor having a pair of inside chains, a pair of outside chains, and an arrangement of sprocket pairs engaging said pairs of said chains for driving said chains, a flexible platform movable by said chains from said first to said second elevational level, said platform having a top surface for supporting a said article, a first end mounted between said inside chains and a second end mounted between said outside chains, said platform comprising:
(a) a plurality of interlocking flights, each said flight comprising:
(i) a first engaging surface;
(ii) a second engaging surface opposite said first engaging surface;
(iii) an elongate portion having an upper surface generally normal to said engaging surfaces for forming a portion of said platform top surface;
(iv) a pair of flanged portions extending from opposite ends of said elongate portion and having opposing inner surfaces disposed generally normal to said elongate portion upper surface;
(v) a pair of opposing pivot pins, each extending from a said flanged portion inner surface; and
(vi) a pair of land portions disposed at opposite ends of said elongate portion adjacent a said flanged portion, each said land portion configured for rotatably receiving a corresponding flanged portion from another said flight and each having an opening for receiving a corresponding pivot pin therefrom to effect an interlocking engagement of said flights forming said platform;
whereby rotation of each said flight is provided in a first direction about the pivot pins of an adjacent said flight interlocked therewith so that said platform is provided to be flexible in said first direction about said sprockets for movement from said second to said first elevational level after a said article is discharged therefrom and is delimited in a second direction opposite said first direction by said second engaging surface abuttingly engaging a corresponding first engaging surface of a said adjacent said flight so that said platform is provided to be rigid for supporting said articles when extended horizontally between said first and second ends;
(b) means for attaching said platform first end to said inside chains; and
(c) means for attaching said platform second end to said outside chains.

21. The platform of claim 20 wherein said elongate portion of each said flight is provided to be flexible for insertion of said pivot pins into the land portions of another said flight to effect an interlocking engagement therebetween.

22. The platform of claim 20 wherein each said flight further comprises a pair of upstanding members extending from opposite ends of said elongate portion.

23. The platform of claim 22 wherein each said upstanding member of each said flight has a first surface forming said first engaging surface and a second surface forming said second engaging surface.

24. The platform of claim 20 wherein each said land portion of each said flight is configured to abuttingly engage a corresponding land portion of an adjacent said flight interlocked therewith at a predetermined angle delimiting rotation in said first direction.

25. The platform of claim 24 wherein each said land portion of each said flight extends from said elongate portion to form a rearward should portion about said opening and a forward shoulder portion for abutting engagement at said predetermined angle with a corresponding rearward shoulder portion of an adjacent said flight interlocked therewith.

26. The platform of claim 20 wherein each said flight is integrally-formed from a polymeric material.

27. The platform of claim 26 wherein each said flight further comprises support ribs integrally-formed into a lower surface of said elongate portion opposite said upper surface.

28. The platform of claim 20 wherein said pivot pins and said land openings of each said flight are provided as a pair of elongate members, each said elongate member extending between a first end adapted to form a said land opening and a second end adapted to form a said pivot pin.

29. The platform of claim 28 wherein a said elongate member is formed of a metallic material.

30. The platform of claim 28 wherein a said elongate member is molded into a said land portion and an adjacent said flanged portion.

31. The platform of claim 30 wherein a said elongate member is formed of a metallic material.

32. The platform of claim 31 wherein each said flight further comprises support ribs integrally-formed into a lower surface of said elongate portion opposite said upper surface.

33. The platform of claim 20 wherein:
said means for attaching said platform first end to said inside chains comprises:
a first elongate bar extending between and through the flanged portions in place of the pivot pins of a said flight at said first end of said platform; and
a first pair of coupling blocks for attaching said first bar to each said inside chain, each said first coupling block having a first end adapted for interlocking engagement with a said inside chain and a second end configured to pivotally receive one end of said first bar; and
said means for attaching said platform second end to said outside chains comprises:

a second elongate bar extending between and through the land portion openings of a said flight at said second end of said platform; and
a second pair of coupling blocks for attaching said second bar to each said outside chain, each said second coupling block having a first end adapted for interlocking engagement with a said inside chain, a second end configured to pivotally receive one end of said second bar, and a cross-section configured to allow a said inside chain to pass between said an end of said second bar and a said outside chain.

34. The platform of claim 28 wherein:
said means for attaching said platform first end to said inside chains comprises:
a first elongate bar extending between and through the flanged portions in place of the pivot pins of a said flight at said first end of said platform; and
a first pair of coupling blocks for attaching said first bar to each said inside chain, each said first coupling block having a first end adapted for interlocking engagement with a said inside chain and a second end configured to pivotally receive one end of said first bar; and
said means for attaching said platform second end to said outside chains comprises:
a second elongate bar extending between and through the land portion openings of a said flight at said second end of said platform; and
a second pair of coupling blocks for attaching said second bar to each said outside chain, each said second coupling block having a first end adapted for interlocking engagement with a said inside chain, a second end configured to pivotally receive one end of said second bar, and a cross-section configured to allow a said inside chain to pass between said an end of said second bar and a said outside chain.

35. A method for conveying articles infed to a vertical conveyor at a first elevational level to a second elevational level wherein said vertical conveyor has a pair of inside chains, a pair of outside chains, and an arrangement of sprocket pairs engaging said pairs of said chains for driving said chains, said method comprising:
(a) providing a platform having a top surface for supporting said articles, a first end mounted between said inside chains and a second end mounted between said outside chains, said platform comprising:
(i) a plurality of interlocking flights, each said flight comprising:
a first engaging surface;
a second engaging surface disposed opposite said first engaging surface;
an elongate portion having an upper surface generally normal to said engaging surfaces for forming a portion of said platform top surface;
a pair of flanged portions extending from opposite ends of said elongate portion and having opposing inner surfaces disposed generally normal to said elongate portion upper surface;
a pair of opposing pivot pins, each extending from a said flanged portion inner surface; and
a pair of land portions disposed at opposite ends of said elongate portion adjacent a said flanged portion, each said land portion configured for rotatably receiving a corresponding flanged portion from another said flight and each having an opening for receiving a corresponding pivot pin therefrom to effect an interlocking engagement of said flights forming said platform;

whereby rotation of each said flight is provided in a first direction about the pivot pins of an adjacent said flight interlocked therewith so that said platform is provided to be flexible in said first direction about said sprockets for movement from said second to said first elevational level after said articles are discharged therefrom and is delimited in a second direction opposite said first direction by said second engaging surface abuttingly engaging a corresponding first engaging surface of a said adjacent said flight so that said platform is provided to be rigid for supporting said articles when extended horizontally between said first and second ends;

(ii) means for attaching said platform first end to said inside chains; and (iii) means for attaching said platform second end to said outside chains;

(b) infeeding a said article to said conveyor at said first elevational level;

(c) receiving said infed article on said platform top surface;

(d) extending said platform first and second ends between said inside and outside chains to horizontally dispose said platform;

(e) moving said platform from said first to said second elevational level;

(f) discharging said article from said conveyor; and (g) returning said platform to said first elevational level.

36. The method of claim 35 wherein said elongate portion of each said flight is provided to be flexible for insertion of said pivot pins into the land portions of another said flight to effect an interlocking engagement therebetween.

37. The method of claim 35 wherein each said flight further comprises a pair of upstanding members extending from opposite ends of said elongate portion.

38. The method of claim 37 wherein each said upstanding member of each said flight has a first surface forming said first engaging surface and a second surface forming said second engaging surface.

39. The method of claim 35 wherein each said land portion of each said flight is configured to abuttingly engage a corresponding land portion of an adjacent said flight interlocked therewith at a predetermined angle delimiting rotation in said first direction.

40. The method of claim 39 wherein each said land portion of each said flight extends from said elongate portion to form a rearward should portion about said opening and a forward shoulder portion for abutting engagement at said predetermined angle with a corresponding rearward shoulder portion of an adjacent said flight interlocked therewith.

41. The method of claim 35 further comprising the step of:

(h) returning to step (b) of the method.

42. The method of claim 35 wherein each said flight is integrally-formed from a polymeric material.

43. The method of claim 42 wherein each said flight further comprises support ribs integrally-formed into a lower surface of said elongate portion opposite said upper surface.

44. The method of claim 35 wherein said pivot pins and said land openings of each said flight are provided as a pair of elongate members, each said elongate member extending between a first end adapted to form a said land opening and a second end adapted to form a said pivot pin.

45. The method of claim 44 wherein a said elongate member is formed of a metallic material.

46. The method of claim 43 wherein a said elongate member is molded into a said land portion and an adjacent said flanged portion.

47. The method of claim 46 wherein a said elongate member is formed of a metallic material.

48. The method of claim 47 further comprising support ribs integrally-formed into a lower surface of said elongate portion opposite said upper surface.

49. The method of claim 35 wherein:

said means for attaching said platform first end to said inside chains comprises:

a first elongate bar extending between and through the flanged portions in place of the pivot pins of a said flight at said first end of said platform; and a fist pair of coupling blocks for attaching said first bar to each said inside chain, each said first coupling block having a first end adapted for interlocking engagement with a said inside chain and a second end configured to pivotally receive one end of said first bar, and said means for attaching said platform second end to said outside chains comprises:

a second elongate bar extending between and through the land portion openings of a said flight at said second end of said platform; and a second pair of coupling blocks for attaching said second bar to each said outside chain, each said second coupling block having a first end adapted for interlocking engagement with a said inside chain, a second end configured to pivotally receive one end of said second bar, and a cross-section configured to allow a said inside chain to pass between said an end of said second bar and a said outside chain.

50. The method of claim 44 wherein:

said means for attaching said platform first end to said inside chains comprises:

a first elongate bar extending between and through the flanged portions in place of the pivot pins of a said flight at said first end of said platform; and a first pair of coupling blocks for attaching said first bar to each said inside chain, each said first coupling block having a first end adapted for interlocking engagement with a said inside chain and a second end configured to pivotally receive one end of said first bar; and said means for attaching said platform second end to said outside chains comprises:

a second elongate bar extending between and through the land portion openings of a said flight at said second end of said platform; and a second pair of coupling blocks for attaching said second bar to each said outside chain, each said second coupling block having a first end adapted for interlocking engagement with a said inside chain, a second end configured to pivotally receive one end of said second bar, and a cross-section configured to allow a said inside chain to pass between said an end of said second bar and a said outside chain.

* * * * *